June 3, 1930. J. L. DRAKE 1,761,197
GLASS TANK FURNACE CONSTRUCTION
Filed March 15, 1926
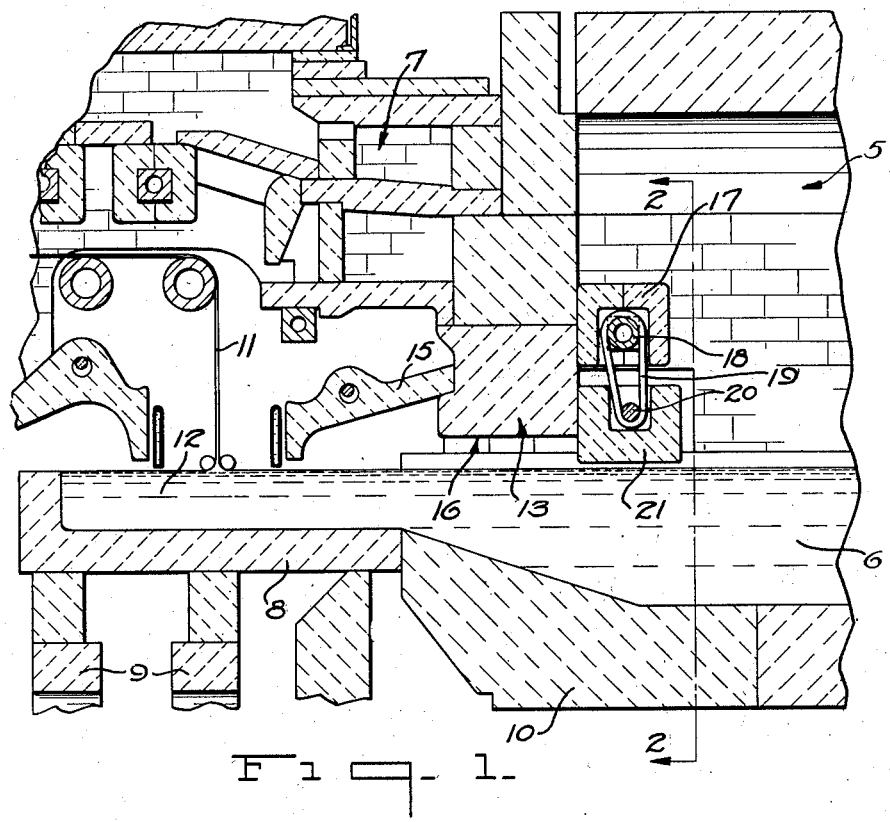
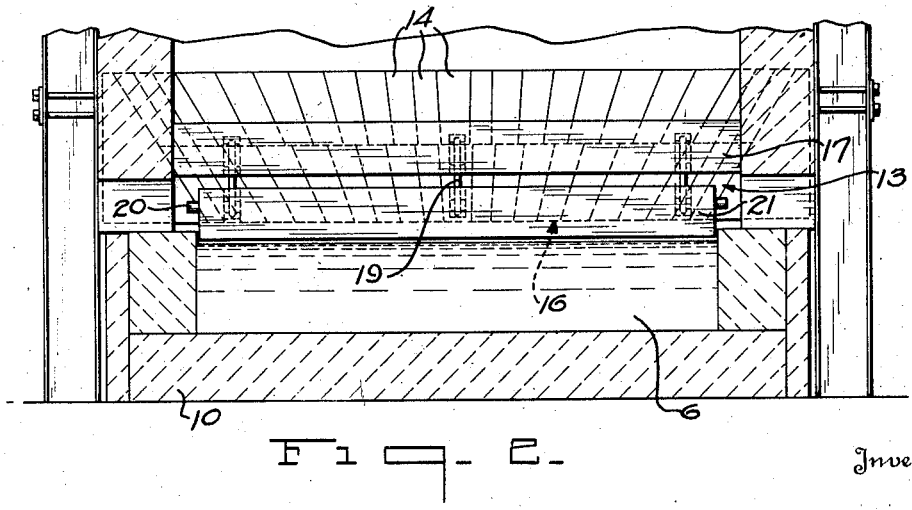
Inventor
John L. Drake.
By Frank Fraser,
Attorney Patented June 3, 1930

1,761,197

UNITED STATES PATENT OFFICE

JOHN L. DRAKE, OF TOLEDO, OHIO, ASSIGNOR TO LIBBEY-OWENS GLASS COMPANY, OF TOLEDO, OHIO, A CORPORATION OF OHIO

GLASS-TANK-FURNACE CONSTRUCTION

Application filed March 15, 1926. Serial No. 94,723.

The present invention relates to glass apparatus, and has particular reference to an improved furnace construction.

An important object of the invention is to provide means for use in connection with a sheet glass tank furnace, for preventing any great loss of heated atmosphere from said tank furnace through the sheet drawing end.

Another very important object of the invention is to provide means between the drawing chamber and cooling chamber of a sheet glass apparatus which will separate the heated atmosphere in said chambers.

A still further object is to provide means for use between the drawing chamber and cooling chamber of a glass apparatus that will safeguard the atmosphere in the cooling chamber from fluctuations of the atmosphere in the drawing chamber, and vice-versa.

Other objects and advantages of the invention will become apparent during the course of the following description.

In the drawings wherein like numerals are employed to designate like parts throughout the same, Fig. 1 is a fragmental vertical longitudinal section through a glass apparatus, showing my invention in operative position, and Fig. 2 is a section taken on line 2—2 in Fig. 1.

In the drawings the numeral 5 designates a cooling chamber which is arranged in open communication with a tank furnace.

The drawing chamber 7 is arranged in open communication with the cooling chamber 5, and includes a draw-pot 8 supported upon stools or the like 9, connection between the pot 8 and the cooling chamber being had by means of a so-called goose-neck 10. A sheet 11 may be drawn from a mass of glass 12 contained in the draw-pot 8, as is well understood in the art. The apparatus here described is similar to the construction shown in the Colburn Patent No. 1,248,809, granted Dec. 4, 1917, but it is to be understood that the invention is not necessarily limited thereto.

Arranged approximately at the juncture of the cooling chamber 5 and drawing chamber 7 is a jack-arch 13 formed from a plurality of sections 14. The jack-arch, in addition to forming a partition, also assists in supporting the lip-tile 15.

As is shown in Fig. 1, the lower surface 16 of the jack-arch is arranged relatively far away from the surface of the molten glass thereunder. If the surface 16 is positioned much closer, the joints between the sections 14 will affect the molten glass. In the production of sheet glass the temperature conditions of the source of supply must be substantially uniform or troubles will be had with the sheet. In Fig. 2, it is seen that the jack-arch 13 comprises a great number of blocks forming a correspondingly great number of joints. These joints, if positioned closely adjacent the surface of the glass, have a tendency to cause what is known in the art as "cold streaks", which result in the formation of a sheet having thick and thin portions.

Although it is not satisfactory to locate the lower broken surface 16 of the jack-arch closely adjacent the surface of the molten glass, it is desirable to separate the atmospheres in the cooling chamber and drawing chamber.

The present invention relates to a device arranged close to the surface of the glass, the lower surface of said device may also be called a jack-arch and being free from all joints. This device comprises a body portion 17 which includes a preferably metallic pipe or the like 18 through which a suitable temperature control medium may be circulated. The body portion 17 is supported by the side walls of the cooling chamber. A plurality of link portions 19 are suspended from the pipe 18, the links supporting a rod 20 being associated with a one-piece refractory slab 21. The slab 21 is preferably formed from a refractory clay, and as it is supported by the links engaging the rod 20, it may be positioned closely adjacent the surface of the molten glass passing thereunder. This slab will prevent any appreciable passage of atmosphere above the glass in either direction so that the desired temperatures can be obtained in both the cooling chamber and drawing chamber without effect upon one another.

If it is desired, the body portion 17 may be adjustably mounted so that the position of the slab can be varied or the slab itself can be so mounted. In addition, the same sort of device can be used at the entrance of the cooling chamber to separate the atmosphere in said cooling chamber from the atmosphere in the tank furnace.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. A jack-arch construction comprising a body portion adapted to be rigidly mounted in a glass furnace, link members carried by the body, and a slab supported by said links.

2. A jack-arch construction comprising a body portion adapted to be rigidly mounted in a glass furnace, link members carried by the body, and a one-piece slab suspended by said links.

3. In glass apparatus, a jack-arch, and a second jack-arch independent of but adjacent to the first jack-arch, said second mentioned jack-arch comprising a body portion, and a slab carried thereby.

4. In glass apparatus, a jack-arch, and a second jack-arch independent of but adjacent to the first jack-arch, said second mentioned jack-arch comprising a fixed body portion, and a slab carried thereby and suspended therebeneath.

5. In glass apparatus, a jack-arch, and a second jack-arch independent of but adjacent to the first jack arch, said second mentioned jack-arch comprising a body portion, means for rigidly securing the body portion in position, and a one-piece slab suspended from said body portion.

6. A jack-arch construction for use in glass furnaces, comprising a fixed body portion, and a slab carried thereby and suspended therebeneath.

Signed at Toledo, in the county of Lucas, and State of Ohio, this 12th day of March, 1926.

JOHN L. DRAKE.

CERTIFICATE OF CORRECTION.

Patent No. 1,761,197.  Granted June 3, 1930, to

JOHN L. DRAKE.

It is hereby certified that error appears in the printed specification of the above numbered patent requiring correction as follows: Page 1, lines 79 and 80, strike out the words "may also be called a jack-arch and" and insert the same to follow after the word "device" in line 81; and that the said Letters Patent should be read with this correction therein that the same may conform to the record of the case in the Patent Office.

Signed and sealed this 22nd day of July, A. D. 1930.

(Seal)

Wm. A. Kinnan,
Acting Commissioner of Patents.